(12) United States Patent
Nagatsu et al.

(10) Patent No.: US 9,599,886 B2
(45) Date of Patent: Mar. 21, 2017

(54) POLARIZER UNIT AND PROJECTOR

(71) Applicant: Seiko Epson Corporation, Tokyo (JP)

(72) Inventors: Takuro Nagatsu, Kasugai (JP);
Kentaro Nakamura, Shiojiri (JP);
Takanori Fukuyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/665,057

(22) Filed: Mar. 23, 2015

(65) Prior Publication Data
US 2015/0277218 A1 Oct. 1, 2015

(30) Foreign Application Priority Data

Mar. 26, 2014 (JP) .................. 2014-063251
Oct. 21, 2014 (JP) .................. 2014-214252

(51) Int. Cl.
*G02F 1/1333* (2006.01)
*G03B 21/20* (2006.01)
*G02B 5/30* (2006.01)
*G02B 7/00* (2006.01)
*G02B 27/10* (2006.01)
*G03B 21/00* (2006.01)
*G03B 21/16* (2006.01)
(Continued)

(52) U.S. Cl.
CPC ....... *G03B 21/2073* (2013.01); *G02B 5/3058* (2013.01); *G02B 7/008* (2013.01); *G02B 27/1046* (2013.01); *G03B 21/006* (2013.01); *G03B 21/16* (2013.01); *H04N 9/3105* (2013.01); *H04N 9/3167* (2013.01); *G02F 1/133308* (2013.01); *G02F 1/133385* (2013.01); *G02F 1/133528* (2013.01); *G02F 2001/133548* (2013.01); *G02F 2201/50* (2013.01)

(58) Field of Classification Search
CPC G03B 21/2073; G02B 27/1046; G02B 7/008; G02B 5/3058; G02F 1/133385; G02F 2201/50; G02F 2001/133548; G02F 1/133308; G02F 1/133528
See application file for complete search history.

(56) References Cited

U.S. PATENT DOCUMENTS

| 6,199,987 B1 * | 3/2001 | Haba ............... G02B 27/283 348/E5.139 |
| 2002/0036819 A1 * | 3/2002 | Watanabe ......... G02F 1/133385 359/275 |
| 2004/0032665 A1 | 2/2004 | Fujimori et al. |

(Continued)

FOREIGN PATENT DOCUMENTS

| CN | 1469190 A | 1/2004 |
| JP | 2010-128225 A | 6/2010 |

*Primary Examiner* — Donald Raleigh
(74) *Attorney, Agent, or Firm* — ALG Intellectual Property, LLC

(57) ABSTRACT

A polarizer unit that polarizes light incident thereon and causes the polarized light to exit includes an inorganic polarizer (light-exiting-side polarizer) that polarizes the incident light, a transparent substrate that is disposed in contact with the light-exiting-side polarizer and allows the light having exited out of the light-exiting-side polarizer to pass and exit, and a holding member that presses the light-exiting-side polarizer and the transparent substrate from opposite sides to sandwich and hold the light-exiting-side polarizer and the transparent substrate.

12 Claims, 7 Drawing Sheets

(51) Int. Cl.
*H04N 9/31* (2006.01)
*G02F 1/1335* (2006.01)

(56) References Cited

U.S. PATENT DOCUMENTS

| | | | | |
|---|---|---|---|---|
| 2004/0125246 | A1* | 7/2004 | Okamori | G02B 27/285 349/5 |
| 2005/0190445 | A1* | 9/2005 | Fukuzaki | G02B 5/3058 359/485.05 |
| 2006/0209266 | A1* | 9/2006 | Utsunomiya | G03B 21/16 353/54 |
| 2007/0258047 | A1* | 11/2007 | Miyamoto | G03B 21/14 353/20 |
| 2007/0297052 | A1* | 12/2007 | Wang | G02B 5/1809 359/487.03 |
| 2008/0259230 | A1* | 10/2008 | Miyakita | B29D 11/0073 349/8 |
| 2013/0016322 | A1* | 1/2013 | Wakabayashi | G03B 21/145 353/20 |

\* cited by examiner

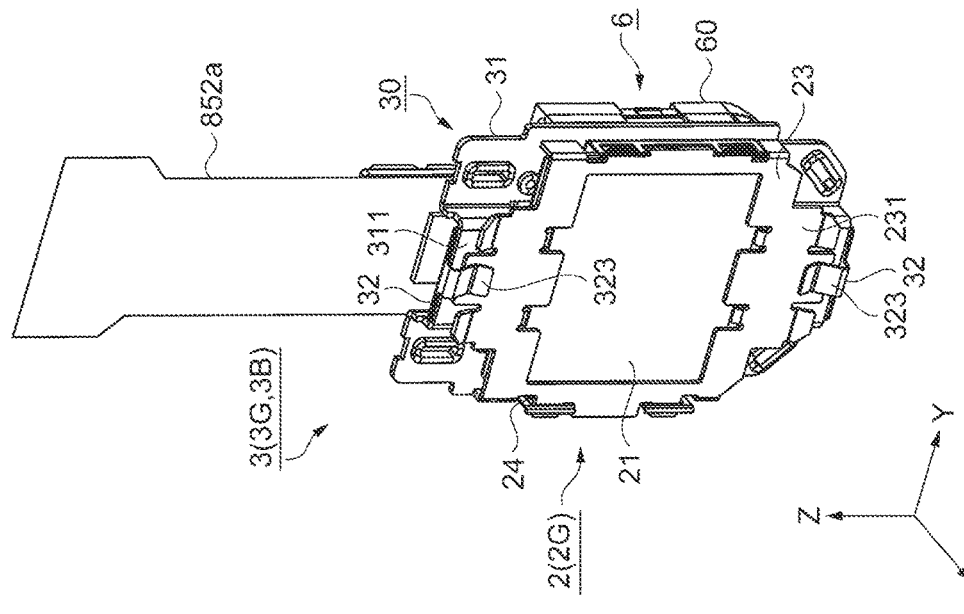
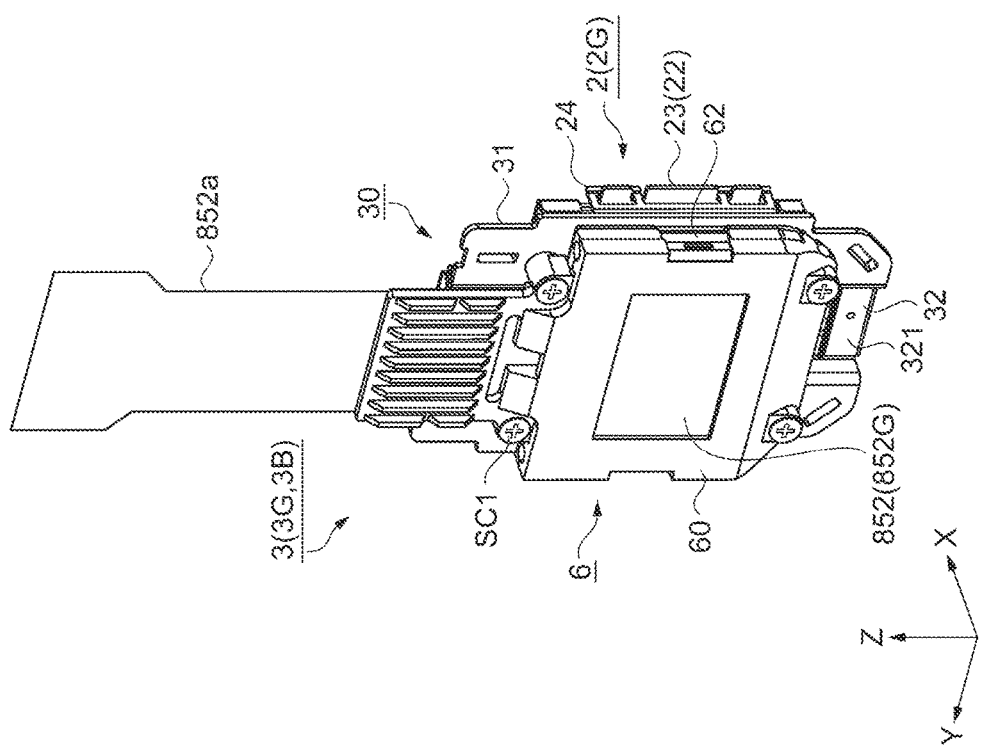

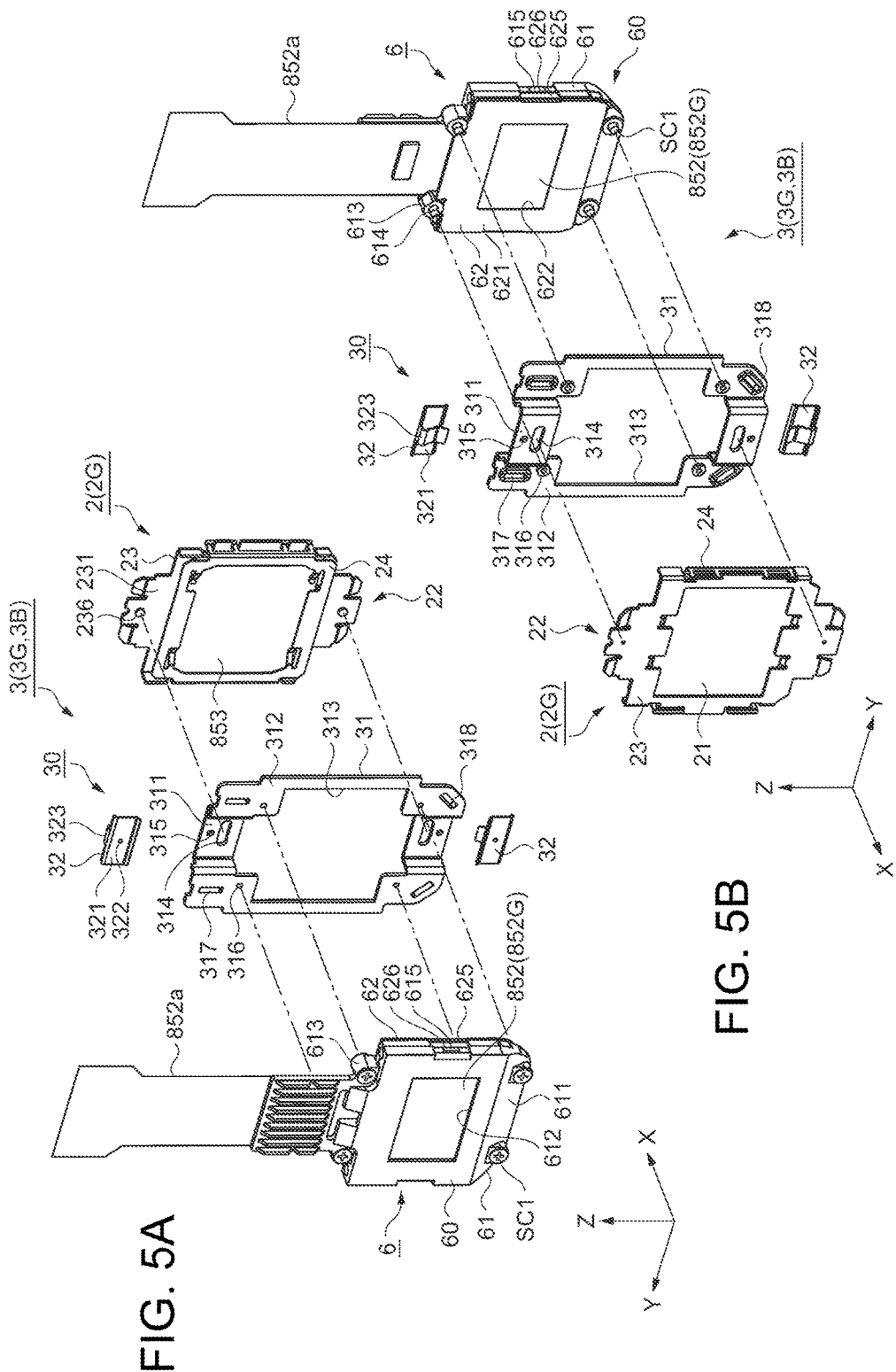

POLARIZER UNIT AND PROJECTOR

BACKGROUND

1. Technical Field

The present invention relates to a polarizer unit and a projector including the polarizer unit.

2. Related Art

There is a known projector in which light outputted from a light source apparatus is modulated by a light modulator in accordance with image information and the modulated light is projected through a projector lens onto a projection surface. In such a projector, reduction in size and increase in luminance advance year after year.

When a transmissive liquid crystal panel is used as the light modulator, in positions upstream (on light incident side) and downstream (on light exiting side) of the liquid crystal panel are provided polarizers (light-incident-side polarizer and light-exiting-side polarizer). As the luminance of the projector increases, the polarizers are likely to deform due to heat generated by the light from the light source apparatus. To prevent the deformation due to the heat, an organic polarizer has been replaced with an inorganic polarizer.

JP-A-2010-128225 discloses a polarizing glass plate unit in which a polarizing glass plate formed only of a reduction layer with no glass layer is bonded to a light transmissive substrate having thermal conductivity higher than that of the glass substrate with an inorganic adhesive and further discloses that the polarizing glass plate unit is used to increase cooling performance.

In JP-A-2010-128225, however, it is necessary to bond the polarizing glass plate (structure in which polarizing layer is provided in optical base) to the light transmissive substrate with an inorganic adhesive. The bonding process requires management of the amount of the adhesive, undesirably resulting in an increase in man-hours. When the polarizing glass plate is replaced with a wire-grid polarizer (structure in which polarizing layer is provided on surface of optical substrate) and the technology disclosed in JP-A-2010-128225 is applied, the adhesive is likely to spill over the substrate surface on which the wire-grid layer is formed and undesirably penetrate through or otherwise damage the polarizing layer, resulting in a concern about a serious adverse effect on the optical characteristics of the polarizing glass unit.

It is therefore desired to provide a polarizer unit that is readily assembled and has improved cooling performance and a projector including the polarizer unit.

SUMMARY

An advantage of some aspects of the invention is to solve at least a part of the problems described above, and the invention can be implemented as the following aspects or application examples.

Application Example 1

A polarizer unit according to this application example is a polarizer unit that polarizes light incident thereon and causes the polarized light to exit, the polarizer unit including an inorganic polarizer that polarizes the incident light, a transparent substrate that is disposed in contact with the inorganic polarizer and allows the light having exited out of the inorganic polarizer or the light to be incident on the inorganic polarizer to pass and exit, and a holding member that presses the inorganic polarizer and the transparent substrate from opposite sides to sandwich and hold the inorganic polarizer and the transparent substrate.

According to the polarizer unit described above, the inorganic polarizer and the transparent substrate are so disposed that they are in contact with each other, and the holding member presses the inorganic polarizer and the transparent substrate from opposite sides to sandwich and hold them. The configuration allows the polarizer unit to be readily assembled with no adhesive. Further, heat generated in the inorganic polarizer can be efficiently transferred to the transparent substrate, which is in contact with the inorganic polarizer, and dissipated from the transparent substrate, whereby the performance of cooling the polarizer unit can be improved.

Application Example 2

In the polarizer unit according to the application example described above, it is preferable that the holding member includes a first holding member having a first opening that allows the light having exited out of the transparent substrate or the inorganic polarizer or the light to be incident on the transparent substrate or the inorganic polarizer to pass and a first engaging portion for engagement purposes, the first holding member holding the transparent substrate and the inorganic polarizer on one surface of the first holding member with the transparent substrate and the inorganic polarizer stacked on each other and a second holding member having a second opening that allows the light to be incident on the transparent substrate or the inorganic polarizer or the light having exited out of the transparent substrate or the inorganic polarizer to pass, a pressing section that presses the inorganic polarizer or the transparent substrate held in the first holding member, and a second engaging portion that engages with the first engaging portion, the second holding member in cooperation with the first holding member pressing the inorganic polarizer and the transparent substrate from opposite sides to sandwich the inorganic polarizer and the transparent substrate.

According to the polarizer unit described above, the first engaging portion of the first holding member, which holds the transparent substrate and the inorganic polarizer stacked on each other on the one surface, is allowed to engage with the second engaging portion of the second holding member, whereby the pressing section presses the inorganic polarizer or the transparent substrate. As a result, the holding member presses the inorganic polarizer and the transparent substrate from opposite sides to sandwich them. The configuration allows the polarizer unit to be readily assembled with no adhesive and allows the inorganic polarizer and the transparent substrate to be held.

Application Example 3

In the polarizer unit according to the application example described above, it is preferable that the thermal conductivity of the transparent substrate is higher than the thermal conductivity of the inorganic polarizer.

According to the polarizer unit described above, since the thermal conductivity of the transparent substrate is higher than the thermal conductivity of the inorganic polarizer, heat generated in the inorganic polarizer can be efficiently transferred to the transparent substrate, which is in contact with the inorganic polarizer, and efficiently dissipated from the transparent substrate.

Application Example 4

In the polarizer unit according to the application example described above, it is preferable that the inorganic polarizer has a wire-grid layer, that the inorganic polarizer is so disposed that the surface thereof on which the wire-grid layer is formed faces the side on which the light is incident, and that the transparent substrate is disposed on the light exiting side of the inorganic polarizer.

According to the polarizer unit described above, which allows light having exited, for example, out of a light modulator to be directly incident on the wire-grid layer, the wire-grid layer will not be distorted due to the heat from the transparent substrate. Therefore, when the light is projected, no color unevenness occurs in a projected image.

Application Example 5

In the polarizer unit according to the application example described above, it is preferable that the inorganic polarizer has an antireflection film formed on a surface facing away from the surface on which the wire-grid layer is formed.

According to the polarizer unit described above, an antireflection film formed on the surface facing away from the surface on which the wire-grid layer is formed prevents the polarized light that exits out of the inorganic polarizer from being reflected and diffused but allows the polarized light to be efficiently incident on the transparent substrate.

Application Example 6

In the polarizer unit according to the application example described above, it is preferable that the transparent substrate has an antireflection film formed at least on a surface on which the light having exited out of the inorganic polarizer is incident.

According to the polarizer unit described above, an antireflection film formed at least on a surface of the transparent substrate on which the light having exited out of the inorganic polarizer is incident prevents the light incident from the inorganic polarizer from being reflected and diffused but allows the light to be efficiently incident on the transparent substrate.

Application Example 7

A projector according to this application example includes a light modulator that modulates light outputted from a light source apparatus in accordance with image information, any of the polarizer units described above, and a fixing member that fixes the light modulator thereto and holds the polarizer unit in a movable manner.

According to the projector described above, since the fixing member fixes the light modulator and holds the polarizer unit in a movable manner, the optical positional relationship between the light modulator and the polarizer can be readily adjusted with reference to the fixing member.

Application Example 8

It is preferable that the projector according to the application example described above further includes a combining prism that combines a plurality of color light fluxes, that at least one of the plurality of color light fluxes is provided with the polarizer unit, and that the polarizer unit is fixed to the combining prism.

According to the projector described above, when the combining prism combines the plurality of color light fluxes to form image light, the polarizer unit can be provided in correspondence with at least one color light flux that generates a large amount of heat among the components of the light from the light source apparatus, whereby the number of polarizer units can be minimized. The projector can thus be manufactured at a reduced cost.

BRIEF DESCRIPTION OF THE DRAWINGS

The invention will be described with reference to the accompanying drawings, wherein like numbers reference like elements.

FIGS. 4A and 4B are perspective views showing an electro-optic unit.

FIGS. 5A and 5B are exploded perspective views of the electro-optic unit.

DESCRIPTION OF EXEMPLARY EMBODIMENTS

An embodiment will be described below with reference to the drawings.

Embodiment

Figure 1:
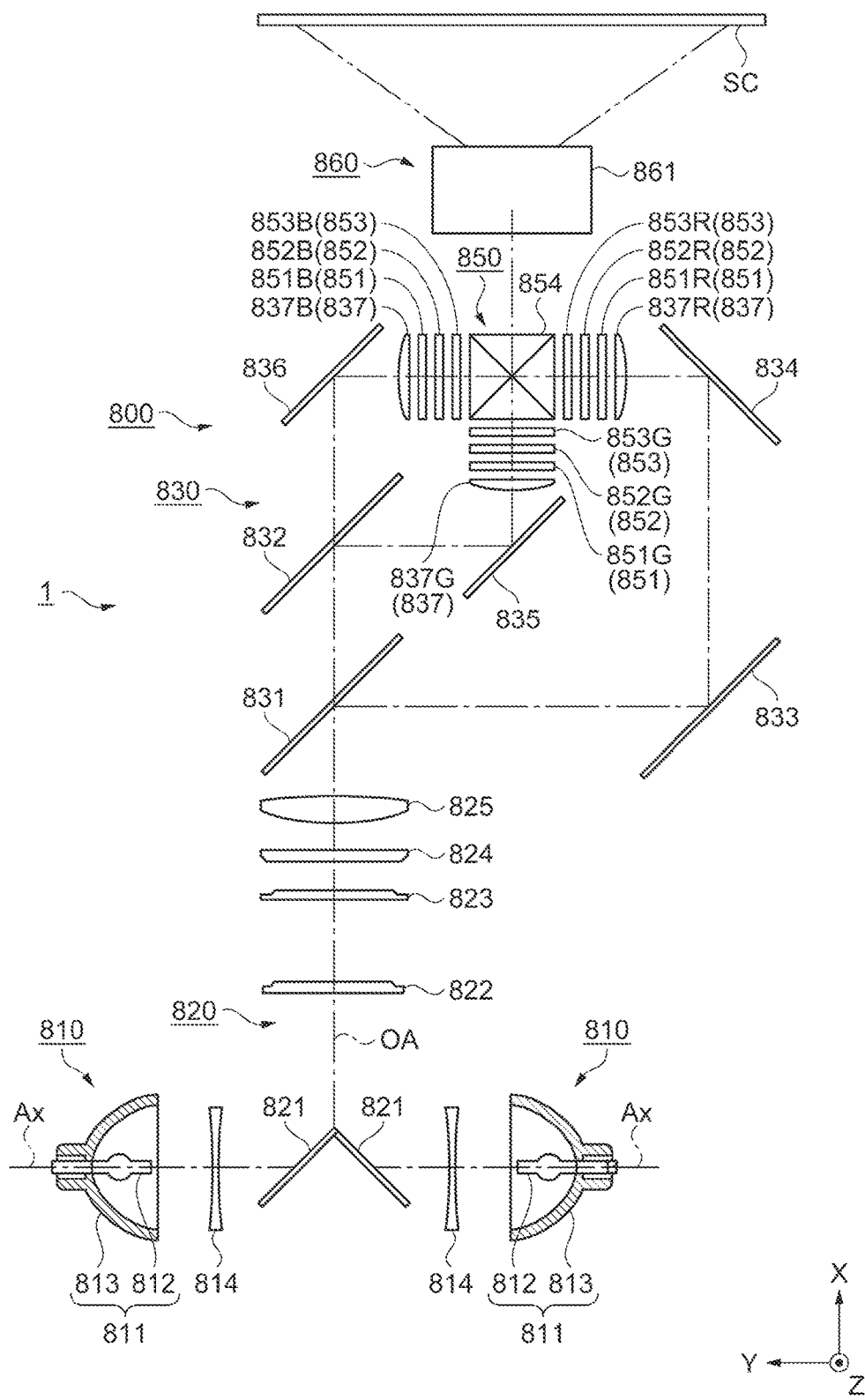
FIG. 1 diagrammatically shows the configuration of an optical system of a projector according to an embodiment.

FIG. 1 diagrammatically shows the configuration of an optical system 800 of a projector 1 according to the embodiment. The configuration and operation of the optical system 800 of the projector 1 will be described with reference to FIG. 1.

In the projector 1 according to the present embodiment, light outputted from each light source apparatus 810 is modulated by liquid crystal panels 852 (852R, 852G, and 852B) as a light modulator in accordance with image information, and the modulated light (image light) is projected through a projection lens 861 onto a projection surface (such as screen SC). The projector 1 is provided with the optical system 800, which is responsible for the operation described above.

The projector 1 further includes a controller (not shown) that oversees and controls overall operation of the projector 1, a power supply (not shown) that supplies the controller and other components with electric power, and a cooler (not shown) that cools the interior of the projector 1, as well as the optical system 800 described above.

The optical system 800 of the projector 1 includes a light source apparatus 810, an illumination system 820, a color separation system 830, an electro-optic system 850, and a projection system 860.

The light source apparatus 810 is formed of two (a pair of) light source apparatus 810 in the present embodiment. The pair of light source apparatus 810 each include a light source apparatus body 811 and a parallelizing lens 814 and are configured in the same manner. The light source apparatus body 811 includes a discharge-type light source 812 and a reflector 813. The pair of light source apparatus 810 are so disposed that optical axes Ax of the light sources 812 substantially coincide with each other and the pair of light source apparatus 810 face each other and sandwich a pair of reflection mirrors 821. Each of the pair of light source apparatus 810 is so configured that light fluxes emitted from the light source 812 are reflected off the reflector 813 and then so aligned with one another by the parallelizing lens 814 that the light fluxes travel in the same direction in parallel to the optical axis Ax toward the reflection mirror 821. Each of the light source apparatus 810 in the present embodiment employs an ultrahigh-pressure mercury lamp.

The illumination system 820 includes the pair of reflection mirrors 821, a first lens array 822, a second lens array 823, a polarization conversion element 824, and a superimposing lens 825. The pair of reflection mirrors 821 are disposed in correspondence with the pair of light source apparatus 810 and reflect the light outputted from the light source apparatus 810 in a direction substantially perpendicular to the optical axes Ax (direction toward first lens array 822). The first lens array 822 is formed of a plurality of lenslets arranged in a matrix. Each of the lenslets divides the light outputted from the light source apparatus 810 and reflected off the reflection mirrors 821 into sub-light fluxes and outputs the sub-light fluxes in the direction along an illumination optical axis OA. The second lens array 823 is formed of lenslets arranged in a matrix in correspondence with the sub-light fluxes having exited out of the lenslets of the first lens array 822. The second lens array 823 causes the sub-light fluxes having exited out of the first lens array 822 to exit toward the superimposing lens 825. The illumination optical axis OA is a central axis of the light outputted toward illumination receiving areas.

The polarization conversion element 824 has a function of aligning the sub-light fluxes having exited out of the second lens array 823, which are randomly polarized light fluxes, with one another into substantially one type of polarized light fluxes usable by each of the liquid crystal panels 852. The sub-light fluxes converted by the polarization conversion element 824 into substantially one type of polarized light fluxes are substantially superimposed on each other by the superimposing lens 825 on the surface of each of the liquid crystal panels 852 so that the illumination receiving area is illuminated at uniform illuminance.

The color separation system 830 includes dichroic mirrors 831 and 832, reflection mirrors 833 to 836, and collector lenses 837 (837R, 837G, and 837B). The dichroic mirror 831 transmits a green (G) light component and a blue (B) light component and reflects a red (R) light component. The dichroic mirror 832 transmits the B light component and reflects the G light component.

The reflection mirror 833 reflects the R light component reflected off the dichroic mirror 831, and the reflected R light component is further reflected off the reflection mirror 834 and incident on the collector lens 837R for R light. The R light incident on the collector lens 837R is parallelized and incident on a light-incident-side polarizer 851R for R light. The reflection mirror 835 reflects the G light component reflected off the dichroic mirror 832, and the reflected G light component is incident on the collector lens 837G for G light. The G light incident on the collector lens 837G is parallelized and incident on a light-incident-side polarizer 851G for G light. The reflection mirror 836 reflects the B light component having passed through the dichroic mirror 832, and the reflected B light component is incident on the collector lens 837B for B light. The B light incident on the collector lens 837B is parallelized and incident on a light-incident-side polarizer 851B for B light.

Since the length of the optical path of the red light is longer than the length of the optical path of each of the other color light fluxes in the embodiment, although not shown, a relay lens is disposed in each of the spaces between the dichroic mirror 831 and the reflection mirror 833 and between the reflection mirror 833 and the reflection mirror 834 to prevent the light from diverging or light usage efficiency from decreasing.

The electro-optic system 850 includes the light-incident-side polarizers 851, the liquid crystal panels 852 as the light modulator, light-exiting-side polarizers 853, across dichroic prism 854 as alight combining prism, and other components. The electro-optic system 850 modulates the color light fluxes incident thereon in accordance with image information to form color image light.

The light-incident-side polarizers 851 are disposed on the light incident side of the liquid crystal panels 852 on a color basis. The light-incident-side polarizers 851 include the light-incident-side polarizer 851R for R light, the light-incident-side polarizer 851G for G light, and the light-incident-side polarizer 851B for B light. The liquid crystal panels 852 include a liquid crystal panel 852R for R light, a liquid crystal panel 852G for G light, and a liquid crystal panel 852B for B light. The light-exiting-side polarizers 853 are disposed on the light exiting side of the liquid crystal panels 852 on a color basis. The light-exiting-side polarizers 853 include a light-exiting-side polarizer 853R for R light, a light-exiting-side polarizer 853G for G light, and a light-exiting-side polarizer 853B for B light.

The R light parallelized by the collector lens 837R is incident on the light-incident-side polarizer 851R, which aligns the polarization directions of the R light with one another, and the resultant R light is incident on an image formation area (illumination receiving area) of the liquid crystal panel 852R. The R light is then modulated by the liquid crystal panel 852R, exits out thereof, and is incident on the light-exiting-side polarizer 853R, which aligns the polarization directions of the R light with one another, and the resultant R light exits out of the light-exiting-side polarizer 853R. Similarly, the G light parallelized by the collector lens 837G is incident on the light-incident-side polarizer 851G, which aligns the polarization directions of the G light with one another, and the resultant G light is incident on the image formation area (illumination receiving area) of the liquid crystal panel 852G. The G light is then modulated by the liquid crystal panel 852G, exits out thereof, and is incident on the light-exiting-side polarizer 853G, which aligns the polarization directions of the G light with one another, and the resultant G light exits out of the light-exiting-side polarizer 853G. Similarly, the B light parallelized by the collector lens 837B is incident on the light-incident-side polarizer 851B, which aligns the polarization directions of the B light with one another, and the resultant B light is incident on the image formation area (illumination receiving area) of the liquid crystal panel 852B. The Blight is then modulated by the liquid crystal panel 852B, exits out thereof, and is incident on the light-exiting-side polarizer 853B, which aligns the polarization directions of the B light with one another, and the resultant B light exits out of the light-exiting-side polarizer 853B.

Each of the liquid crystal panels 852 is a transmissive panel in which a pair of transparent glass substrates encapsulate and seal a liquid crystal material, which is an electro-optic substance. For example, each of the liquid crystal panels 852 uses a polysilicon TFT as a switching device to modulate the polarization direction of one type of linearly polarized light having exited out of the light-incident-side polarizer 851 in accordance with an inputted image signal.

The configuration of the light-incident-side polarizers 851 will be described.

The light-incident-side polarizer 851R for R light in the present embodiment is formed of an organic polarizer. In detail, the light-incident-side polarizer 851R for R light is formed of an organic (resin) polarizing film. In the present embodiment, the polarizing film is configured without a TAC (triacetylcellulose) layer. The light-incident-side polarizer 851R for R light is so configured that quartz substrates as light transmissive substrates are used to sandwich the polarizing film opposite sides. The light transmissive substrates that sandwich the polarizing film are not necessarily quartz substrates and may instead be sapphire substrates.

Each of the light-incident-side polarizer 851G for G light and the light-incident-side polarizer 851B for B light in the present embodiment is formed of an inorganic polarizer. In detail, the inorganic polarizer in the present embodiment has a wire-grid layer in which a large number of minute linear ribs made, for example, of aluminum are arranged in parallel to each other on a quartz glass substrate. The inorganic polarizer transmits polarized light having a polarization direction perpendicular to the direction in which the linear ribs extend and absorbs polarized light having a polarization direction parallel to the direction in which the linear ribs extend.

The configuration of the light-exiting-side polarizers 853 will be described.

The light-exiting-side polarizer 853R for R light in the present embodiment is formed of an organic polarizer that is substantially the same as the organic polarizer that forms the light-incident-side polarizer 851R for R light and is configured in substantially the same manner. Each of the light-exiting-side polarizer 853G for G light and the light-exiting-side polarizer 853B for B light in the present embodiment is formed of an inorganic polarizer that is substantially the same as the inorganic polarizers that form the light-incident-side polarizer 851G for G light and the light-incident-side polarizer 851B for B light and is configured in substantially the same manner.

The cross dichroic prism 854 combines the modulated light fluxes (optical images) modulated on a color basis and outputted through the light-exiting-side polarizers 853 with one another to form color image light. The cross dichroic prism 854 is formed by bonding four rectangular prisms and thus has a substantially square shape in a plan view. Optical multilayer films are formed along the substantially X-shaped interfaces between the bonded rectangular prisms. The optical multilayer films deflect the R light and the B light in such a way that they light travel in the same direction as the G light. The three color light fluxes are thus combined with one another. The combined color image light is caused to exit toward the projection lens 861.

The projection system 860 includes the projection lens 861. The projection lens 861 is formed of a combination of a plurality of lenses and enlarges and projects the modulated and combined image light from the electro-optic system 850 to form a projection image (color image) on the screen SC or any other projection surface.

Figure 2A:
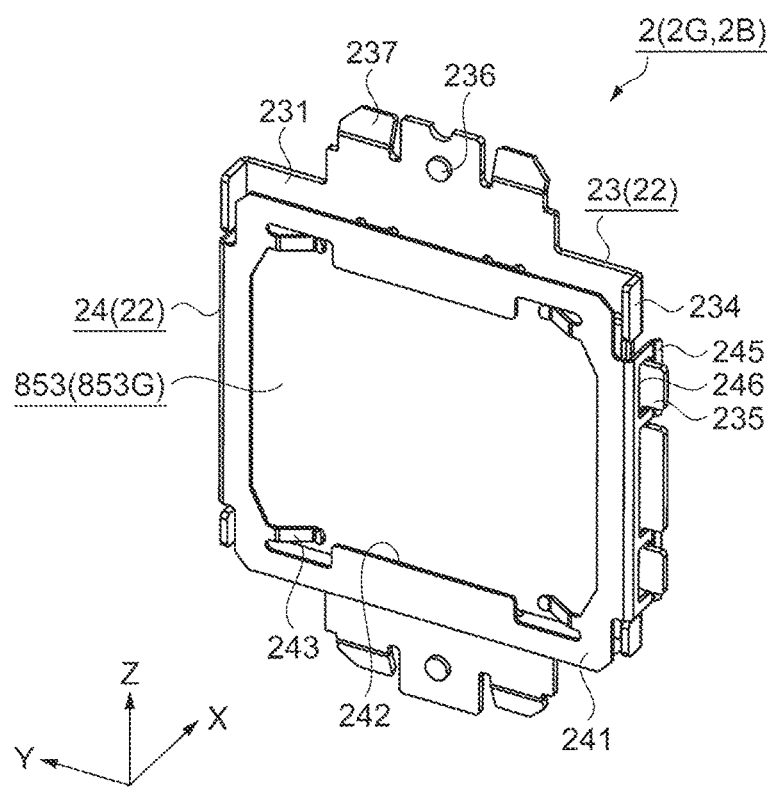
FIGS. 2A and 2B are perspective views showing a polarizer unit.
Figure 2B:
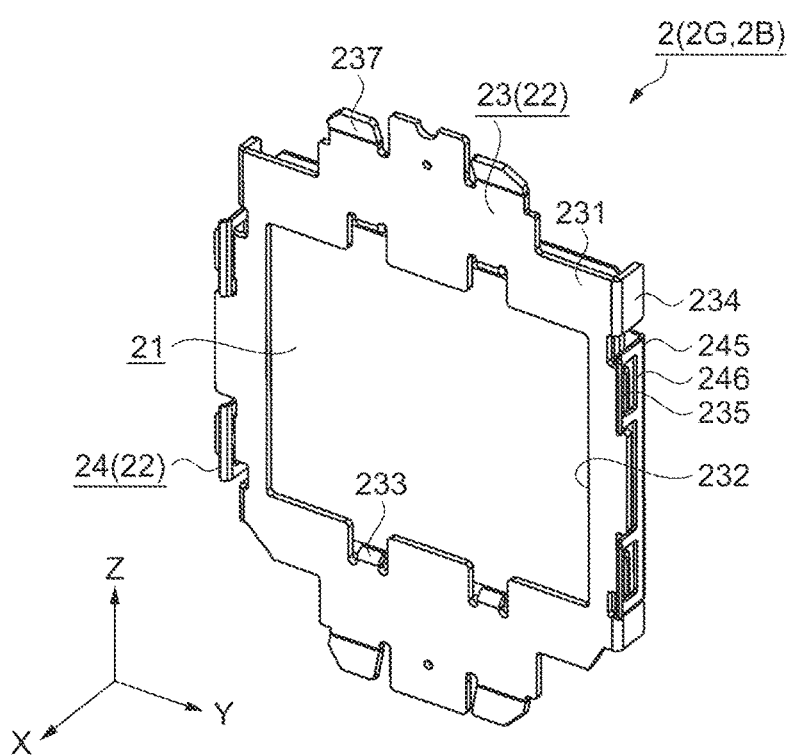
Figures 3A, 3B:
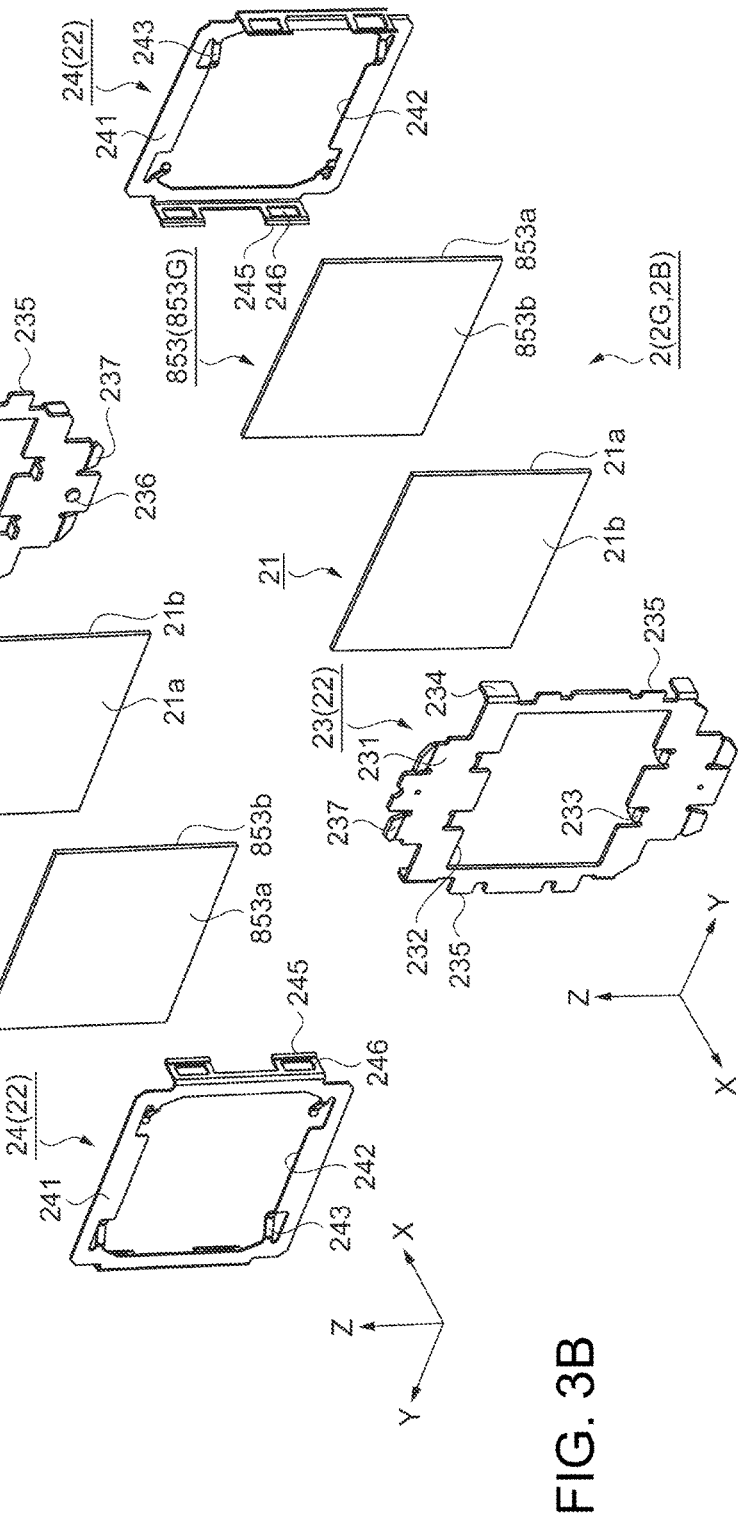
FIGS. 3A and 3B are exploded perspective views of the polarizer unit.

FIGS. 2A and 2B are perspective views showing a polarizer unit 2. FIG. 2A is a perspective view of the polarizer unit 2 viewed along a −X direction, and FIG. 2B is a perspective view of the polarizer unit 2 viewed along a +X direction. FIGS. 3A and 3B are exploded perspective views of the polarizer unit 2. FIG. 3A is an exploded perspective view of the polarizer unit 2 viewed along the −X direction, and FIG. 3B is an exploded perspective view of the polarizer unit 2 viewed along the +X direction. It is noted that FIGS. 2A and 2B and FIGS. 3A and 3B show a polarizer unit 2G for G light for ease of description. In the present embodiment, it is further noted that the G light and the B light are each provided with the polarizer unit 2.

In the following drawings including FIG. 1 to FIGS. 3A and 3B, an XYZ orthogonal coordinate system is used for ease of description. In detail, it is assumed that an X direction (+X direction) is the direction in which modulated light exits out of the liquid crystal panel 852G for G light, a Y direction (+Y direction) is the direction in which modulated light exits out of the liquid crystal panel 852R for R light, and a Z direction (+Z direction) is the direction perpendicular to the X and Y directions and oriented upward in FIGS. 2A and 2B. Further, the +Z direction is also called an upward direction (−Z direction is also called downward direction) and the −X direction corresponds to the light incident side (+X direction corresponds to light exiting side) as appropriate.

In the present embodiment, the light-exiting-side polarizers 853G and 853B for the G light and the B light are each configured in the form of the polarizer unit 2. In the present embodiment, the polarizer units 2 are provided to improve cooling performance because the amount of heat generated in the light-exiting-side polarizers 853G and 853B for the G light and the B light by the light outputted from the light source apparatus 810 is particularly greater than the heat generated in the light-exiting-side polarizer 853R for R light. The cooling in the present embodiment, although not shown, is performed based on what is called air cooling in which air is discharged upward through a duct (that forms cooler) provided below the polarizer unit 2 in FIGS. 2A and 2B and sprayed to the polarizer unit 2.

The configuration of the polarizer unit 2 will be described.

The polarizer unit 2G includes the light-exiting-side polarizer 853G, a transparent substrate 21, which transmits light having exited out of the light-exiting-side polarizer 853G, and a holding member 22, which presses the light-exiting-side polarizer 853G and the transparent substrate 21 from opposite sides to sandwich and hold them, as shown in FIGS. 2A and 2B and FIGS. 3A and 3B. In the following description, the polarizer unit 2G is called the polarizer unit 2, and the light-exiting-side polarizer 853G is called the light-exiting-side polarizer 853.

The light-exiting-side polarizer 853 has a rectangular shape, as shown in FIGS. 3A and 3B, and is formed of an inorganic polarizer in which a wire-grid layer is formed, as described above. In the inorganic polarizer, the not-shown wire-grid layer (layer having a large number of minute linear ribs made, for example, of aluminum arranged in parallel to each other) is formed on a surface 853a of a quartz glass substrate, as shown in FIGS. 3A and 3B. The wire-grid layer faces the liquid crystal panel 852. In the present embodiment, the light-exiting-side polarizer 853 (inorganic polarizer) has an antireflection film that is not shown but is formed on a surface 853b, which faces away from the surface 853a, on which the wire-grid layer is formed.

The transparent substrate 21 is disposed on the light exiting side of the light-exiting-side polarizer 853, as shown in FIGS. 3A and 3B. The transparent substrate 21 has a rectangular shape and has thermal conductivity higher than the thermal conductivity of the inorganic polarizer (quartz glass substrate). In the present embodiment, the transparent substrate 21 is a sapphire substrate. Further, the transparent substrate 21 has an antireflection film that is not shown but is formed on each of a surface 21a, on which light having exited out of the light-exiting-side polarizer 853 is incident, and a surface 21b, through which light having passed through the transparent substrate 21 exits.

The holding member 22 is formed of a first holding member 23, which is positioned on the light exiting side of the transparent substrate 21, and a second holding member 24, which is positioned on the light incident side of the light-exiting-side polarizer 853.

The first holding member 23 is formed by bending a plate member and has a first holding member body 231 having a substantially rectangular shape, and a rectangular first opening 232 is formed in a central portion of the first holding member body 231, as shown in FIGS. 3A and 3B. The first holding member 23 further has two guiding pieces 233 formed at each of the upper and lower sides of the first opening 232, and each of the guiding pieces 233 is bent at a position shifted upward or downward from the upper or lower side of the first opening 232 and extends toward the light incident side.

The first holding member 23 further has two guiding pieces 234 formed at each of upper and lower end portions of each of the Y-direction sides of the first holding member body 231, and each of the guiding pieces 234 is bent toward the light incident side. The guiding pieces 233 and 234 serve as portions that guide the transparent substrate 21 and the light-exiting-side polarizer 853, when they are held in the first holding member 23, and determine the positions thereof in the upward and downward directions and in the Y direction. The first holding member 23 further has two first engaging portions 235 for engagement purposes, which are formed by providing cutouts at each of the Y-direction sides of the first holding member body 231 and inside the guiding pieces 234, which are formed in the upper and lower portions of the Y-direction side.

The first holding member 23 still further has protrusions 236 formed at the center of the upper and lower sides of the first holding member body 231, and each of the protrusions 236 protrudes toward the light incident side to prevent a second fixing member 32, which holds the polarizer unit 2 in a fixing member 30, which will be described later, from coming off. Further, inclined pieces 237 are formed on opposite sides of each of the protrusions 236 by inclining the sides on opposite sides of the protrusion 236 toward the light exiting side.

The second holding member 24 is formed by bending a plate member and has a second holding member body 241 having a substantially rectangular shape, and a rectangular second opening 242 is formed in a central portion of the second holding member body 241, as shown in FIGS. 3A and 3B. The second holding member 24 has two pressing pieces 243 formed at the corners of each of the upper and lower sides of the second opening 242, and each of the pressing pieces 243 is so bent toward the light exiting side that it produces a spring force. The pressing pieces 243 form a pressing section.

The pressing pieces 243 are in detail so formed that they are outside the upper and lower sides of the second opening 242. In other words, the pressing pieces 243 are so formed that they are outside the range irradiated with the light having exited out of the light modulator (liquid crystal panel 852). The thus configured pressing pieces 243 do not block the light having exited out of the liquid crystal panel 852.

The second holding member 24 is further so configured that the Y-direction sides of the second holding member body 241 are bent toward the light exiting side, and that two second engaging portions 245 for engagement purposes, which extend toward the light exiting side, are formed at upper and lower end portions of each of the thus bent portions. Each of the second engaging portions 245 has a rectangular guiding hole 246 formed therein.

A method for assembling the polarizer unit 2 will be described.

The upper and lower outer sides and the Y-direction outer sides of the transparent substrate 21 are first allowed to follow the guiding pieces 233 and 234 of the first holding member 23, and the transparent substrate 21 is then allowed to come into contact with and placed on the light-incident-side surface (one surface) of the first holding member 23 (first holding member body 231). The light-exiting-side polarizer 853 is then similarly allowed to follow the guiding pieces 233 and 234 and is allowed to come into contact with (be stacked on) and placed on the light-incident-side surface 21a of the transparent substrate 21. In this process, a light-exiting-side surface 853b of the quartz glass substrate of the light-exiting-side polarizer 853 is allowed to come into contact with the light-incident-side surface 21a of the transparent substrate 21. As a result, the surface 853a of the quartz glass substrate of the light-exiting-side polarizer 853 on which the wire-grid layer has been formed faces the light incident side.

The second holding member 24 is then placed on the first holding member 23. In detail, the second holding member 24 is placed from the light incident side on the first holding member 23 on which the transparent substrate 21 and the light-exiting-side polarizer 853 are stacked and placed.

In this process, the second engaging portions 245 of the second holding member 24 are allowed to engage with the first engaging portion 235 of the first holding member 23. In detail, front end portions of the two first engaging portions 235 on one of the Y-direction sides of the first holding member 23 are first inserted into and hooked to the corresponding guiding holes 246 of the second engaging portions 245 of the second holding member 24.

Thereafter, front end portions of the two first engaging portions 235 on the other one of the Y-direction sides of the first holding member 23 are inserted into and hooked to the corresponding guiding holes 246 of the second engaging portions 245 of the second holding member 24. As a result, the first engaging portions 235 are positioned in the corresponding guiding holes 246 of the second engaging portions 245, and a state in which the first engaging portions 235 protrude through the guiding holes 246 is achieved.

After the state described above is achieved, the pressing pieces 243 of the second holding member 24 produce a spring force and press the light-exiting-side polarizer 853 and the transparent substrate 21 toward the light exiting side. As a result, the second engaging portions 245 of the second holding member 24 and the first engaging portions 235 of the first holding member 23 engage with each other with forces in opposite directions applied thereto. The holding member 22 thus presses the light-exiting-side polarizer 853 and the transparent substrate 21 from opposite sides to sandwich and hold (fix) them. The light-exiting-side polarizer 853 and the transparent substrate 21 are stacked on each other and pressed against each other. It is noted that no adhesive is used between the light-exiting-side polarizer 853 and the transparent substrate 21.

The light-exiting-side surface 853b of the light-exiting-side polarizer 853 and the light-incident-side surface 21a of the transparent substrate 21 are stacked on each other with a gap (air layer) formed therebetween in a microscopic sense, but heat is sufficiently transferred between the light-exiting-side polarizer 853 and the transparent substrate 21.

In the present embodiment, the first engaging portions 235 formed on the first holding member 23 are so configured that the two first engaging portions 235 on the −Y side and the two first engaging portions 235 on the +Y side differ from each other in terms of the amount of protrusion (amount of hooked portion). In detail, the amount of protrusion of the two first engaging portions 235 on the −Y side is set to be greater than the amount of protrusion of the two first engaging portions 235 on the +Y side. The difference allows the assembly (engagement step) to be readily performed.

The assembly of the polarizer unit 2 is thus completed.

The modulated light having exited out of the liquid crystal panel 852 is incident on the polarizer unit 2. In this process, the modulated light is incident on the light-exiting-side polarizer 853 through the second opening 242 of the second holding member 24. The light-exiting-side polarizer 853 aligns the polarization directions of the modulated light with one another, and the resultant light passes through the transparent substrate 21 and exits out thereof through the first opening 232 of the first holding member 23.

FIGS. 4A and 4B are perspective views showing an electro-optic unit 3. FIG. 4A is a perspective view of the electro-optic unit 3 viewed along the −X direction, and FIG. 4B is a perspective view of the electro-optic unit 3 viewed along the +X direction. FIGS. 5A and 5B are exploded perspective views of the electro-optic unit 3. FIG. 5A is an exploded perspective view of the electro-optic unit 3 viewed along the −X direction, and FIG. 5B is an exploded perspective view of the electro-optic unit 3 viewed along the +X direction. FIGS. 4A and 4B and FIGS. 5A and 5B show an electro-optic unit 3G for G light for ease of description. In the present embodiment, the G light and the B light are each provided with the electro-optic unit 3.

In the present embodiment, the electro-optic unit 3G integrates the liquid crystal panel 852G for G light and the light-exiting-side polarizer 853G for G light (polarizer unit 2G) into a single part. Similarly, an electro-optic unit 3B integrates the liquid crystal panel 852B for B light and the light-exiting-side polarizer 853B for B light (polarizer unit 2B) into a single part.

The configuration of the electro-optic unit 3 will be described.

The electro-optic unit 3G includes the liquid crystal panel 852G for G light, the polarizer unit 2G for G light described above, and a fixing member 30, which fixes the liquid crystal panel 852G and holds the polarizer unit 2G, as shown in FIGS. 4A and 4B and FIGS. 5A and 5B. The fixing member 30 includes a first fixing member 31 and a second fixing member 32, which holds the polarizer unit 2G in the first fixing member 31 and eventually fixes the polarizer unit 2G thereto. The electro-optic unit 3B is configured in the same manner as the electro-optic unit 3G.

In the following description, the liquid crystal panel 852G is called the liquid crystal panel 852, and the polarizer unit 2G is called the polarizer unit 2.

A flexible cable 852a, which inputs an image signal to the liquid crystal panel 852, is connected to the liquid crystal panel 852, as shown in FIGS. 4A and 4B and FIGS. 5A and 5B. Further, the liquid crystal panel 852 is accommodated in a panel fixing frame 60 and fixed thereto, as shown in FIGS. 4A and 4B and FIGS. 5A and 5B.

In the following description, the state in which the liquid crystal panel 852 is accommodated in the panel fixing frame 60 is called a liquid crystal apparatus 6. The electro-optic unit 3 therefore includes the liquid crystal apparatus 6, the polarizer unit 2, and the fixing member 30.

The panel fixing frame 60 is formed of a first panel fixing frame 61 and an engaging member 62, which engages with the liquid crystal panel 852 accommodated in the first panel fixing frame 61 with the liquid crystal panel 852 sandwiched between the first panel fixing frame 61 and the engaging member 62.

The first panel fixing frame 61 is formed by shaping a metal (magnesium alloy in present embodiment) in injection molding and has a first fixing frame body 611 having a substantially rectangular shape, and a rectangular opening 612 is formed in a central portion of the first fixing frame body 611, as shown in FIGS. 5A and 5B. The first panel fixing frame 61 has two attachment portions 613 formed at the corners of each of the upper and lower edges of the first fixing frame body 611. Each of the attachment portions 613 has a hole 614 formed therein, through which a screw is inserted to fix the liquid crystal apparatus 6 to the fixing member 30, which will be described later.

The first panel fixing frame 61 further has third engaging portions 615 having a triangular cross-sectional shape and formed at the center of the Y-direction edges of the first fixing frame body 611. Further, the light exiting side of the first fixing frame body 611 is recessed inward (toward light incident side) to form an accommodation portion (not shown) that accommodates the liquid crystal panel 852.

The engaging member 62 is formed by bending a plate member and has an engaging member body 621 having a substantially rectangular shape, and a rectangular opening 622 is formed in a central portion of the engaging member body 621, as shown in FIGS. 5A and 5B. The engaging member 62 further has fourth engaging portions 625 formed at the center of the Y-direction sides of the engaging member body 621, and each of the fourth engaging portions 625 is bent toward the light incident side. Each of the fourth engaging portions 625 has a guiding hole 626 formed therein, through which the corresponding third engaging portion 615 of the first panel fixing frame 61 is inserted.

A method for assembling the liquid crystal apparatus 6 will be described.

The liquid crystal panel 852 is accommodated in the accommodation portion of the first panel fixing frame 61. The engaging member 62 is then allowed to engage with the first panel fixing frame 61 from the light exiting side. In detail, the fourth engaging portions 625 of the engaging member 62 are pressed from the light exiting side against the third engaging portions 615, which are formed on the Y-direction edges of the first panel fixing frame 61, to achieve a state in which the third engaging portions 615 are inserted into and hooked to the guiding holes 626 of the fourth engaging portions 625. The liquid crystal apparatus 6 is thus assembled.

The fixing member 30 is formed of the first fixing member 31 and the second fixing members 32.

The first fixing member 31 fixes the liquid crystal apparatus 6 and holds the polarizer unit 2. The first fixing member 31 is positioned between the liquid crystal apparatus 6 and the polarizer unit 2. The first fixing member 31 is formed by bending a plate member and has a first fixing member body 311 having a substantially rectangular shape, and the Y-direction edges of the first fixing member body 311 are bent toward the light incident side and further so bent that the bent portions are perpendicular to the light incident direction to form receiving surfaces 312, which receive the liquid crystal apparatus 6, as shown in FIGS. 5A and 5B. The first fixing member 31 further has an opening 313 having a substantially rectangular shape in a plan view and formed in a portion ranging from the first fixing member body 311 to the receiving surfaces 312.

The first fixing member body 311 has elongated holes 314 formed on the upper and lower sides of the opening 313 and concentrically around the center of the opening 313 (center of illumination optical axis OA), and the elongated holes 314 are used to adjust the position of the polarizer unit 2. Further, holes 315 are formed above the upper elongated hole 314 and below the lower elongated hole 314. Moreover, threaded holes 316 used to fix the liquid crystal apparatus 6 to the first fixing member 31 are formed in the receiving surfaces 312 in end portions thereof above and below the opening 313.

Further, elongated holes 317 having a longitudinal direction that coincides with the upper/lower direction and used to adjust the position of the liquid crystal apparatus 6 are formed above the two upper threaded holes 316, and inclined, elongated holes 318 used to adjust the position of the liquid crystal apparatus 6 are similarly formed below the two lower threaded holes 316.

The second fixing member 32 holds the polarizer unit 2 in the first fixing member 31 and eventually fixes it thereto. The second fixing member 32 is formed of a pair of second fixing members 32. Each of the second fixing members 32 has a rectangular second fixing member body 321. A protrusion 322, which protrudes toward the light incident side, is formed at the center of the second fixing member body 321. Each of the second fixing members 32 further has a spring portion 323 formed thereon, and the spring portion 323 extends from the center of the upper edge of the second fixing member body 321 toward the light exiting side and is then bent downward so that it functions as a spring.

A method for assembling the electro-optic unit 3 will be described.

The liquid crystal apparatus 6 is first fixed to the first fixing member 31. In detail, the light-exiting-side surface of the liquid crystal apparatus 6 is allowed to come into contact with and stacked on the light incident side of the receiving surfaces 312 of the first fixing member 31. Screws SC 1 are then inserted into the holes 614 of the attachment portions 613 of the liquid crystal apparatus 6 and threaded into the threaded holes 316 of the receiving surfaces 312. The liquid crystal apparatus 6 is thus fixed to the first fixing member 31.

The polarizer unit 2 is then held in the first fixing member 31. In detail, the light-incident-side surface of the first holding member body 231 of the polarizer unit 2 (first holding member 23) is allowed to come into contact with and stacked on the light exiting side of the first fixing member body 311 of the first fixing member 31. In this process, the protrusions 236 of the polarizer unit 2 are inserted into the elongated holes 314 of the first fixing member 31.

In the state in which the first holding member body 231 of the polarizer unit 2 (first holding member 23) is stacked on the first fixing member body 311 of the first fixing member 31, the second fixing members 32 are so inserted from the upper and lower sides of the assembled structure that the second fixing members 32 sandwich the assembled structure. As a result, the protrusions 322 of the second fixing members 32 are inserted into the holes 315 of the first fixing member 31, and the second fixed member bodies 321 and the spring portions 323 press the first fixing member 31 (first fixing member body 311) and the first holding member 23 (first holding member body 231), which are thus sandwiched and held.

In this state, the protrusions 322 of the second fixing members 32 inserted into the holes 315 of the first fixing member 31 prevent the second fixing members 32 from coming off the first fixing member 31. The protrusions 236 of the polarizer unit 2 are then allowed to slide along the elongated holes 314 of the first fixing member 31, allowing the polarizer unit 2 to move (pivot) relative to the first fixing member 31. In other words, the fixing member 30 of the electro-optic unit 3 can fix the liquid crystal apparatus 6 and hold the polarizer unit 2 in a movable manner.

The assembly of the electro-optic unit 3 is thus completed.

A schematic description will be made of positional adjustment between the liquid crystal apparatus 6 and the polarizer unit 2.

After the electro-optic unit 3 is assembled, the polarizer unit 2 is so adjusted that the polarization direction associated therewith is aligned with the polarization direction associated with the liquid crystal apparatus 6 (liquid crystal panel 852). In detail, the first fixing member 31 that fixes the liquid crystal apparatus 6 is fixed. A fixture (not shown) is then used to allow the protrusions 236 of the polarizer unit 2 to slide along the elongated holes 314 of the first fixing member 31 so that the polarizer unit 2 pivots relative to the first fixing member 31. In the adjustment, the polarizer unit 2 is so positioned that the contrast of the light having exited out of the polarizer unit 2 is maximized. After the adjustment is completed, the polarizer unit 2 is fixed to the fixing member 30 by injecting an adhesive into the gaps between the second fixing members 32 and the first fixing member 31 (first fixing member body 311)/the first holding member 23 (first holding member body 231), which are sandwiched between the second fixing members 32, and curing the adhesive. The adjustment is made in the same manner as the adjustment for the B light and the G light.

Figure 6:
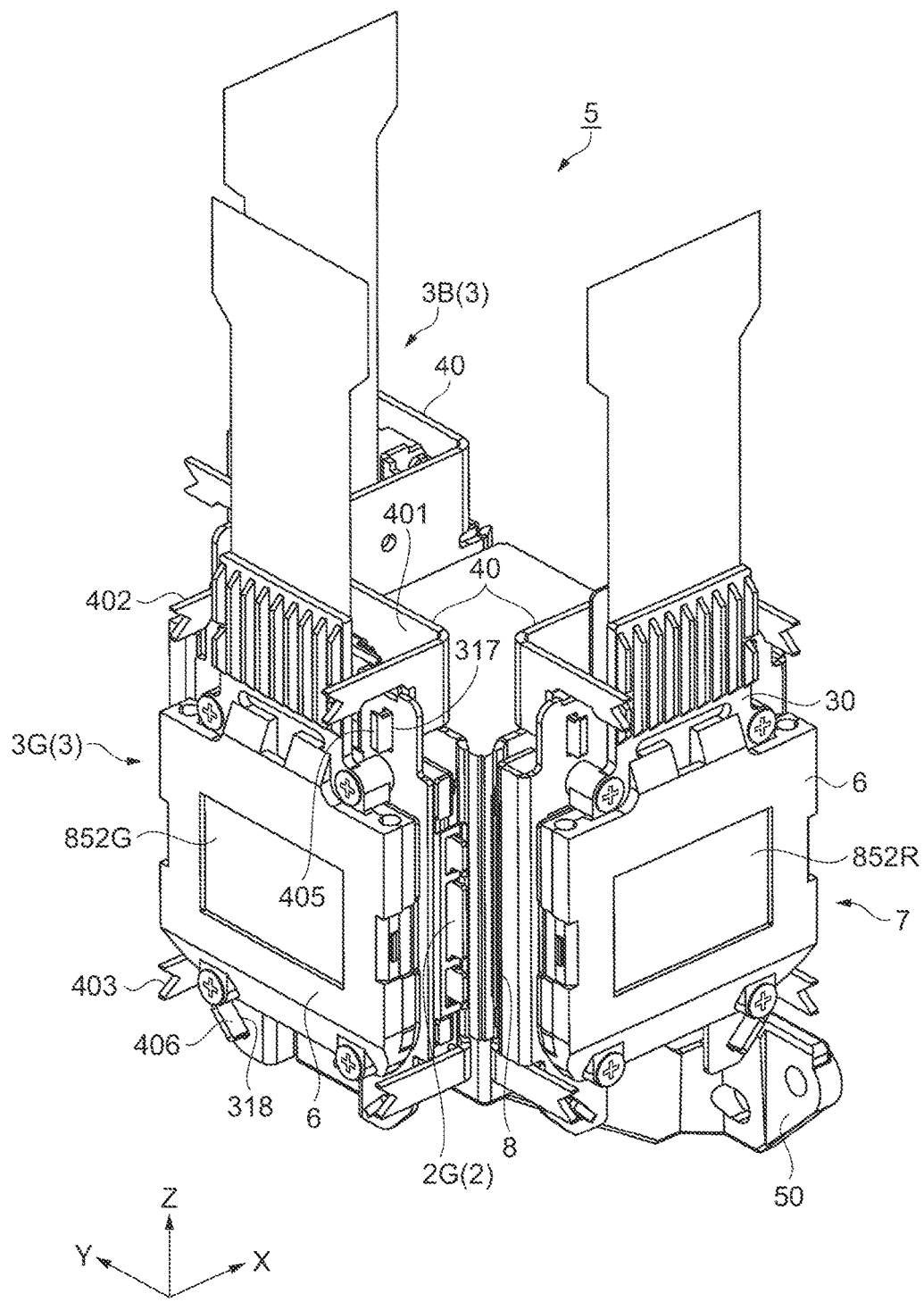
FIG. 6 is a perspective view showing an electro-optic apparatus.

FIG. 6 is a perspective view showing an electro-optic apparatus 5. FIG. 6 is a perspective view of the electro-optic apparatus 5 viewed along the −X direction. The configuration and operation of the electro-optic apparatus 5 will be described with reference to FIG. 6.

In the present embodiment, the electro-optic apparatus 5 integrates the electro-optic system 850 excluding the light-incident-side polarizers 851. In other words, the electro-optic apparatus 5 is an apparatus in which the liquid crystal panels 852 and the light-exiting-side polarizers 852 are fixed on a color basis to three surfaces of the cross dichroic prism 854 that are adjacent and perpendicular to each other. In still other words, the electro-optic apparatus 5 is an apparatus in which the electro-optic unit 3B for B light and the electro-optic unit 3G for G light, which have been described above, are fixed to the cross dichroic prism 854 and an electro-optic unit 7 for R light is further fixed thereto.

The configuration of the electro-optic unit 7 for R light will now be schematically described.

The configuration of a polarizer unit 8 for R light will first be schematically described.

The polarizer unit 8 for R light, in which an organic polarizer is used as the light-exiting-side polarizer 853R for R light, has a configuration different from those of the polarizer units 2 used for the B light and the G light. In detail, the light-exiting-side polarizer 853R for R light is configured in substantially the same manner as the light-incident-side polarizer 851R for R light described above and has a configuration in which an organic (resin) polarizing film is sandwiched between quartz substrates as light transmissive substrates. The polarizer unit 8 for R light then has a configuration in which a holding member (not shown) for R light configured differently from the holding member 22 used for the B light and the G light is used to hold the light-exiting-side polarizer 853R.

The configuration of the electro-optic unit 7 for R light will next be schematically described.

The liquid crystal apparatus 6 for R light is formed of the liquid crystal panel 852R for R light and the panel fixing frame 60, which is the same as those for the B light and the G light, and configured in the same manner as the liquid crystal apparatus 6 for the B light and the G light. The electro-optic unit 7 for R light is specifically so configured that a fixing member 30 for R light, which is substantially the same as those for the B light and the G light, fixes the liquid crystal apparatus 6 for R light and holds the polarizer unit 8 for R light in a movable (pivotal) manner. The positional relationship between the liquid crystal apparatus 6 for R light and the polarizer unit 8 for R light is then adjusted. The adjustment is made in the same manner as the adjustment for the B light and the G light.

The electro-optic apparatus 5 includes apparatus fixing members 40, which fix the electro-optic unit 3B for B light, the electro-optic unit 3G for G light, and the electro-optic unit 7 for R light to the cross dichroic prism 854. The apparatus fixing members 40 are members which fix the electro-optic units 3B, 3G, and 7 to the corresponding surfaces of the cross dichroic prism 854 and based on which the electro-optic units 3B, 3G, and 7 are so adjusted that corresponding color pixel positions coincide with one another.

The configuration of the apparatus fixing members 40 will be described with reference to an apparatus fixing member 40 for G light for ease of description. Apparatus fixing members 40 for the other color light fluxes are configured in the same manner. The apparatus fixing member 40 is formed by bending a plate member and has an apparatus fixing member body 401 having a substantially rectangular shape, and a rectangular opening (not shown) is formed in a central portion of the apparatus fixing member body 401, as shown in FIG. 6.

The apparatus fixing member 40 further has grasped pieces 402 formed at upper portions of the Y-direction sides of the apparatus fixing member 40, and the grasped pieces 402 are bent toward the light incident side and grasped when the pixel position adjustment is made. The apparatus fixing member 40 further has holding pieces 405 formed below the grasped pieces 402, and the holding pieces 405 hold the electro-optical apparatus 5. Further, grasped pieces 403, which are bent toward the light incident side and grasped when the pixel position adjustment is made, are formed at lower portions of the Y-direction sides of the apparatus fixing member 40. Moreover, holding pieces 406, which are bent toward the light incident side and inclined and hold the electro-optic apparatus 5, are formed in positions adjacent to the grasped pieces 403.

A method for assembling the electro-optical apparatus 5 to the apparatus fixing members 40 and a method for adjusting the positions of the pixels in the electro-optical apparatus 5 will be described.

The light-exiting-surface-side of each of the apparatus fixing members 40 is first temporarily fixed to the corresponding surface of the cross dichroic prism 854. The two upper holding pieces 405 of the apparatus fixing member 40 are then inserted into the elongated holes 317 of the electro-optic unit 3 (first fixing member 31). The two lower holding pieces 406 of the apparatus fixing member 40 are simultaneously inserted into the elongated holes 318 of the electro-optic unit 3 (first fixing member 31). The assembly described above is performed on a color basis.

After the assembly, since the holding pieces 405 inserted into the elongated holes 317 and the holding pieces 406 inserted into the elongated holes 318 do not in contact with but separate from the elongated holes 317 and 318, respectively, the holding pieces 405 and 406 can move in the elongated holes 317 and 318. In other words, the electro-optic unit 3 (first fixing member 31), which has the elongated holes 317 and 318 formed therein, can move relative to the apparatus fixing member 40, which has the holding pieces 405 and 406 formed thereon.

A fixture (not shown) is then used to grasp the grasped pieces 402 on a color basis. With respect to the G light, which is reference color light in the present embodiment, a fixture (not shown) that grasps, for example, the electro-optic unit 3B for B light is used to adjust the position of the electro-optic unit 3B for B light. In detail, the electro-optic unit 3B for B light is so adjusted by causing it to pivot relative to the apparatus fixing member 40 that the pixels of an image formed by the light outputted from the electro-optic unit 3B for B light and projected on the screen SC spatially coincide with the corresponding pixels of an image formed by the light outputted from the electro-optic unit 3G for G light and projected on the screen SC.

A fixture (not shown) for grasping the remaining electro-optic unit 7 for R light is then used to adjust the positions of the pixels in the electro-optic unit 7 for R light. The adjustment is also made in the same manner as described above. The pixel position adjustment described above allows the positions of the corresponding color pixels to coincide with (be superimposed on) one another. The adjustment of the positions of the pixels in the electro-optic apparatus 5 is thus completed.

The electro-optic units 3G, 3B, and 7 having undergone the pixel position adjustment are then fixed to the respective apparatus fixing members 40. In detail, an adhesive is injected into the gaps between the elongated holes 317, 318 of the electro-optic units 3 (first fixing members 31) and the inserted holding pieces 405, 406 of the apparatus fixing members 40, and the adhesive is then cured. At this point, the apparatus fixing members 40 having been temporarily fixed to the cross dichroic prism 854 are also completely fixed. The electro-optic apparatus 5 to which the electro-optic units 3 and 7 having undergone the pixel position adjustment are fixed is thus completed.

The electro-optic apparatus 5 is then fixed as follows: The bottom surface of the cross dichroic prism 854 is fixed to a prism fixing member 50; and the prism fixing member 50 is fixed to a projection enclosure (not shown) that accommodates the projection system 860.

Figure 7:
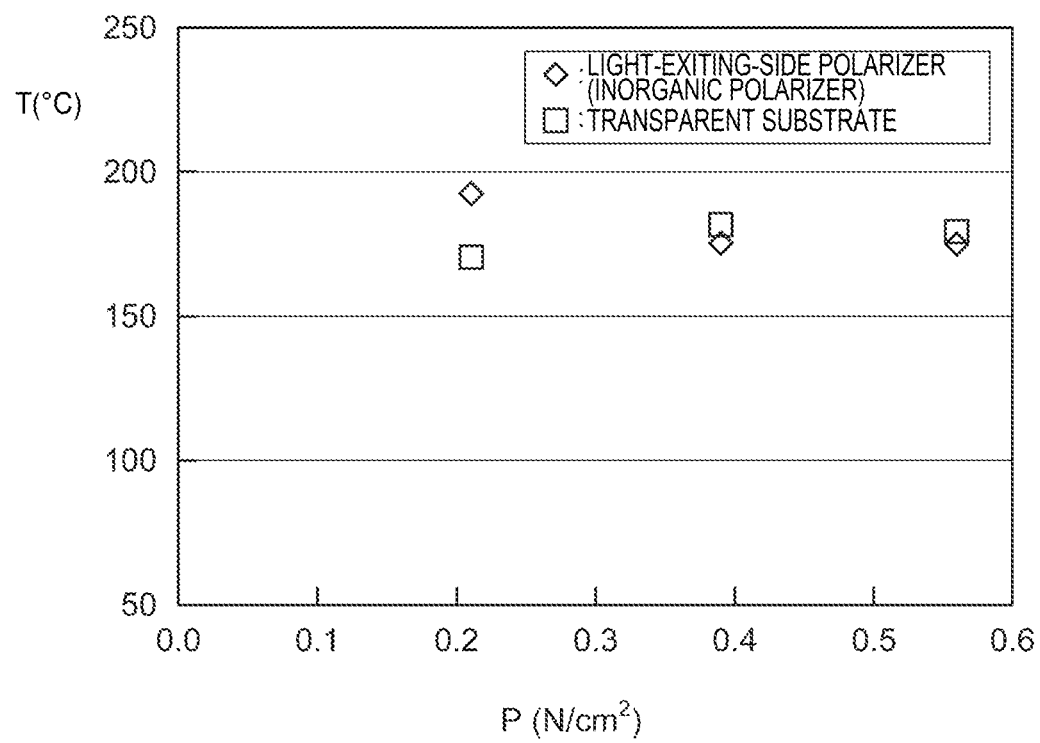
FIG. 7 shows a result of an experiment conducted to examine the relationship between a pressing force exerted by pressing pieces in the polarizer unit and the difference in temperature between a light-exiting-side polarizer and a transparent substrate.

FIG. 7 shows a result of an experiment conducted to examine the relationship between the pressing force exerted by the pressing pieces 243 in each of the polarizer units 2 and the difference in temperature between the light-exiting-side polarizer 853 and the transparent substrate 21. The purpose of the experiment is determination of the magnitude of the pressing force exerted by the pressing pieces 243 that achieves efficient transfer of heat generated in the light-exiting-side polarizer 853 (inorganic polarizer) to the transparent substrate 21.

In detail, the inventors have conducted the experiment assuming that the case where heat generated in the light-exiting-side polarizer 853 is efficiently transferred to the transparent substrate 21 corresponds to a state in which the difference in temperature between the light-exiting-side polarizer 853 and the transparent substrate 21 is substantially zero. To this end, the inventors have examined the temperatures of the light-exiting-side polarizer 853 and the transparent substrate 21 (difference in temperature therebetween) with the magnitude of the pressing force exerted by the pressing pieces 243 changed.

A method for conducting the experiment will be described.

The experiment was so conducted that one of the polarizer units 2 according to the present embodiment (see FIGS. 2A and 2B and FIGS. 3A and 3B) was used and light was allowed to be incident on the surface 853a on which the wire-grid layer has been formed. Further, the pressure applied by the four pressing pieces 243 of the second holding member 24 to the light-exiting-side polarizer 853 was changed to three levels. In other words, three types of second holding members 24 that allow the pressing pieces 243 to produce different magnitudes of pressure were used. The temperature was measured at the center of the surface 853a (wire-grid layer in exact sense) of the light-exiting-side polarizer 853 and at the center of the surface 21b of the transparent substrate 21. For the measurement, a thermocouple (not shown) was installed at each of the measurement points.

In FIG. 7, the horizontal axis represents the pressing force P (N/cm$^2$), and the vertical axis represents the temperature T (° C.). The contact area of the light-exiting-side polarizer 853 and the transparent substrate 21 was set at about 9.5 (cm$^2$). The pressing force P is defined as a value obtained by dividing the sum of the magnitudes of the pressure applied by the four pressing pieces 243 by the contact area. Specifically, the pressure (N) applied by each of the pressing pieces 243 was changed to three levels of "2", "3.7", and "5.3". The pressing force (N/cm$^2$) was therefore changed to three levels of "0.21", "0.39", and "0.56".

FIG. 7 shows that, when the pressing force P is 0.21 (N/cm$^2$), the temperature of the light-exiting-side polarizer 853 is higher than the temperature of the transparent substrate 21, and that the heat in the light-exiting-side polarizer 853 is transferred to the transparent substrate 21 but not in an efficient manner. FIG. 7 further shows that when the pressing force P is greater than or equal to 0.39 (N/cm$^2$), the temperature of the light-exiting-side polarizer 853 and the temperature of the transparent substrate 21 are roughly equal to each other (substantially no difference in temperature), and that the heat in the light-exiting-side polarizer 853 is efficiently transferred to the transparent substrate 21.

From the experiment, the inventors found that in order to achieve efficient transfer of the heat generated in the light-exiting-side polarizer 853 (inorganic polarizer) to the transparent substrate 21, the pressing force P (N/cm$^2$) exerted by the pressing pieces 243 needs to be set as follows: P≥0.39.

According to the polarizer units 2 and the projector 1 using the polarizer units 2 in the present embodiment, the following advantageous effects are provided.

In each of the polarizer units 2 according to the present embodiment, the light-exiting-side polarizer 853 (light-exiting-side polarizer 853G or 853B in present embodiment) formed of an inorganic polarizer and the transparent substrate 21 are so disposed that they are in contact with each other, and the holding member 22 presses the light-exiting-side polarizer 853 and the transparent substrate 21 from opposite sides to sandwich and hold them. The configuration allows the polarizer unit 2 to be readily assembled with no adhesive. Further, the heat generated in the light-exiting-side polarizer 853 can be efficiently transferred to the transparent substrate 21, which is in contact with the light-exiting-side polarizer 853, and dissipated from the transparent substrate 21, whereby the performance of cooling the polarizer unit 2 can be improved.

In each of the polarizer units 2 according to the present embodiment, the first engaging portions 235 of the first holding member 23, which holds the transparent substrate 21 and the light-exiting-side polarizer 853, which is formed of an inorganic polarizer, stacked on each other, are allowed to engage with the second engaging portions 245 of the second holding member 24 by moving the second holding member 24 toward the front side of the light-exiting-side polarizer 853, whereby the pressing section (pressing pieces 243) presses the light-exiting-side polarizer 853. As a result, the holding member 22 presses the light-exiting-side polarizer 853 and the transparent substrate 21 from opposite sides to sandwich them. The configuration allows the polarizer unit 2 to be readily assembled with no adhesive and allows the light-exiting-side polarizer 853 and the transparent substrate 21 to be held.

In each of the polarizer units 2 according to the present embodiment, since the thermal conductivity of the transparent substrate 21 (sapphire substrate) is higher than the thermal conductivity of the light-exiting-side polarizer 853 (quartz glass substrate) formed of an inorganic polarizer, the heat generated in the light-exiting-side polarizer 853 can be efficiently transferred to the transparent substrate 21, which is in contact with the light-exiting-side polarizer 853, and efficiently dissipated from the transparent substrate 21.

In each of the polarizer units 2 according to the present embodiment, the light-exiting-side polarizer 853 formed of an inorganic polarizer has the wire-grid layer, and the surface 853a on which the wire-gird layer is formed is the surface on which the modulated light having exited out of the liquid crystal apparatus 6 is incident. The transparent substrate 21 is then disposed on the light exiting side of the light-exiting-side polarizer 853. According to the thus configured polarizer unit 2, which allows the modulated light having exited out of the liquid crystal apparatus 6 to be directly incident on the wire-grid layer, the wire-grid layer will not be distorted due to the heat from the transparent substrate 21. Therefore, when image light is projected through the projection system 860, no color unevenness occurs in a projected image.

In each of the polarizer units 2 according to the present embodiment, the light-exiting-side polarizer 853, which is formed of an inorganic polarizer and has an antireflection film formed on the surface 853b facing away from the surface on which the wire-grid layer is formed, prevents the polarized light that exits out of the light-exiting-side polarizer 853 from being reflected and diffused to form stray light but allows the polarized light to be efficiently incident on the transparent substrate 21.

In each of the polarizer units 2 according to the present embodiment, the transparent substrate 21 has an antireflection film formed on each of the surface 21a, on which the polarized light having exited out of the light-exiting-side polarizer 853 formed of an inorganic polarizer is incident, and the surface 21b, through which the polarized light having passed through the transparent substrate 21 exits. The front antireflection film prevents the polarized light incident from the light-exiting-side polarizer 853 from being reflected and diffused to form stray light but allows the polarized light to be efficiently incident on the transparent substrate 21. The rear antireflection film prevents the polarized light having passed through the transparent substrate 21 from being reflected and diffused to form stray light but allows the polarized light to be efficiently incident on the cross dichroic prism 854.

In the projector 1 according to the present embodiment, in each of the electro-optic units 3, since the fixing member 30 fixes the liquid crystal apparatus 6 (liquid crystal panel 852) and holds the polarizer unit 2 in a movable manner, the polarization direction associated with the light-exiting-side polarizer 853 formed of an inorganic polarizer can be readily adjusted relative to the polarization direction associated with liquid crystal panel 852 with reference to the fixing member 30 (liquid crystal apparatus 6).

The projector 1 according to the present embodiment includes the cross dichroic prism 854, which combines the color light fluxes, the R light, the G light, and the B light, with one another, and the G light and the B light are each provided with the polarizer unit 2, which is fixed to the cross dichroic prism 854. The polarizer units 2 are thus provided in correspondence with the G light and the B light, which generate a large amount of heat among the components of the light from the light source apparatus 810, whereby the number of polarizer units 2 can be minimized. The projector 1 can thus be manufactured at a reduced cost.

In the projector 1 according to the present embodiment, use of the polarizer units 2 allows improvement in the performance of cooling the light-exiting-side polarizers 853 each formed of an inorganic polarizer, whereby the projector 1 can be improved in terms of life, luminance, quietness, and other factors. Further, since the improvement allows the power for driving a cooling fan that forms the cooler to be lowered, the amount of dust that passes through an intake air filter (member that prevents dust from entering enclosure) and enters the apparatus can be reduced, whereby dust-proof performance of the projector 1 can be improved.

In each of the polarizer units 2 according to the present embodiment, setting the pressing force P ($N/cm^2$) exerted by the pressing pieces 243 to be P≥0.39 allows the heat generated in the light-exiting-side polarizer 853 (inorganic polarizer) to be efficiently transferred to the transparent substrate 21. Since the heat generated in the light-exiting-side polarizer 853 is thus efficiently transferred to the transparent substrate 21 and dissipated therefrom, the performance of cooling the polarizer unit 2 can be improved.

The invention is not limited to the embodiment described above, and a variety of changes, improvements, and other modifications can be made thereto to the extent that they do not depart from the substance of the invention. Variations follow.

Each of the polarizer units 2 according to the embodiment described above has a configuration in which the light-exiting-side polarizer 853 formed of an inorganic polarizer is disposed on the side on which the modulated light having exited out of the liquid crystal panels 852 is incident and the transparent substrate 21 is disposed in a position downstream of the light-exiting-side polarizer 853. Instead, the transparent substrate 21 may be disposed on the light incident side, and the light-exiting-side polarizer 853 may be disposed in a position downstream of the transparent substrate 21. The configuration also allows the polarizer unit 2 to be readily assembled with no adhesive. Further, the heat generated in the light-exiting-side polarizer 853 can be efficiently transferred to the transparent substrate 21, which is in contact with the light-exiting-side polarizer 853, and dissipated from the transparent substrate 21, whereby the performance of cooling the polarizer unit 2 can be improved.

In each of the polarizer units 2 according to the embodiment described above, the first holding member 23 is disposed in a position downstream of the second holding member 24, and the modulated light having exited out of the liquid crystal panel 852 is incident on the polarizer unit 2 through the second opening 242 of the second holding member 24. Instead, the first holding member 23 may be disposed in a position upstream of the second holding member 24, and the modulated light having exited out of the liquid crystal panel 852 may be incident on the polarizer unit 2 through the first opening 232 of the first holding member 23.

The light-exiting-side polarizers 853 formed of an inorganic polarizer are each configured in the form of the polarizer unit 2 according to the embodiment described above. The configuration described above is not necessarily employed, and any other polarizer formed of an inorganic polarizer may be configured in the form of the polarizer unit 2.

In each of the polarizer units 2 according to the embodiment described above, the heat generated in the light-exiting-side polarizer 853 (inorganic polarizer) is efficiently transferred to the transparent substrate 21 with the pressing force P ($N/cm^2$) exerted by the pressing pieces 243 set to be P≥0.39. Further, even when the transparent substrate 21 is disposed on the light incident side and the light-exiting-side polarizer 853 is disposed in a position downstream of the transparent substrate 21, the condition on the pressing force P ($N/cm^2$) is maintained, and the heat generated in the light-exiting-side polarizer 853 (inorganic polarizer) is efficiently transferred to the transparent substrate 21. Moreover, the condition on the pressing force P is maintained for a polarizer unit having a configuration in which the first holding member 23 is disposed in a position upstream of the second holding member 24.

The G light and the B light are each provided with the polarizer unit 2 according to the embodiment described above. The configuration described above is not necessarily employed, and only one color light flux may be provided with the polarizer unit 2. Still instead, each of the three color light fluxes including the R light may be provided with the polarizer units 2. In any case, which color light is provided with the polarizer unit 2 may be determined as appropriate in accordance with the amount of light incident on the light-exiting-side polarizer.

In each of the polarizer units 2 according to the embodiment described above, the transparent substrate 21 is a sapphire substrate. The transparent substrate 21 is not limited to a sapphire substrate and may be a quartz substrate, a magnesium oxide substrate, or any other substrate having thermal conductivity higher than the thermal conductivity of the inorganic polarizer (quartz glass substrate).

In each of the polarizer units 2 according to the embodiment described above, the substrate on which the wire-grid layer is formed is a quartz glass substrate. Instead of a quartz glass substrate, a low-expansion glass substrate may be used. In either case, the amount of distortion of the substrate due to heat can be reduced as compared, for example, with the amount of distortion of a white sheet glass substrate.

In each of the polarizer units 2 according to the embodiment described above, the inorganic polarizer has the wire-grid layer. The inorganic polarizer is not necessarily configured this way and may be made of polarizing glass having aluminum minute particles or any other metal minute particles oriented in the glass material to achieve optical anisotropy (inorganic absorption-type polarizer).

In each of the polarizer units 2 according to the embodiment described above, an antireflection film is formed on both the surfaces 21a and 21b of the transparent substrate 21. An antireflection film is not necessarily formed on both the surfaces 21a and 21b and may be formed only on the surface 21a, on which the light from the light-exiting-side polarizer 853 is incident. In this case, an advantageous effect can also be provided.

The optical system 800 in the embodiment described above is presented by way of example, and a variety of optical elements may be added to the optical system 800. Further, the optical elements of the illumination system 820 and the color separation system 830 may be changed.

For example, in the electro-optic system 850, a wave plate may be disposed on the light exiting side of each of the light-exiting-side polarizer 853R for R light and the light-exiting-side polarizer 853B for B light. In this configuration, the polarization directions of the R light and the B light can be aligned with the polarization direction of the G light before the color light fluxes are combined in the cross dichroic prism 854 and projected therethrough. In this case, the wave plates may be attached with an adhesive to the surfaces of the cross dichroic prism 854 on which the R light and the B light are incident.

Further, for example, in the electro-optic system 850, an optical compensation element may be disposed on the light exiting side of each of the liquid crystal panels 852. In this configuration, the directions of the polarized light having exited out of the liquid crystal panels 852 can be aligned with one another for improvement in native contrast. In this case, the optical compensation elements may each be an inorganic wave plate and may be disposed in the electro-optic units 3G, 3B, and 7.

Moreover, for example, in the electro-optic system 850, a pre-polarizer may be disposed on the light exiting side of the light-exiting-side polarizer 853G for G light, which has the greatest amount of incident light. In this configuration, when image light is projected through the projection system 860, no ghost due to stray light will be present in a projected image. In this case, the pre-polarizer may be attached with an adhesive to the surface of the cross dichroic prism 854 on which the G light is incident.

In the projector 1 according to the embodiment described above, the three liquid crystal panels 852 are employed as the light modulator. The number of liquid crystal panels is not limited to three, and one liquid crystal panel configured to display a color image may be employed as the light modulator.

The entire disclosures of Japanese Patent Application No. 2014-063251 filed on Mar. 26, 2014 and Japanese Patent Application No. 2014-214252 filed on Oct. 21, 2014 are expressly incorporated by reference herein.

What is claimed is:

1. A projector comprising:
a light modulator that modulates light outputted from a light source apparatus in accordance with image information;
a polarizer unit that polarizes light incident thereon and causes the polarized light to exit;
a first fixing member to which the light modulator is fixed, and that holds the polarizer unit;
a combining prism that combines a plurality of color light fluxes; and
a second fixing member configured to be held to the combining prism and hold the first fixing member,
wherein the polarizer unit includes
an inorganic polarizer that polarizes the incident light;
a transparent substrate that is disposed in contact with the inorganic polarizer and allows light having exited out of the inorganic polarizer, or light to be incident on the polarizer, to pass and exit; and
a holding member that presses the inorganic polarizer and the transparent substrate from opposite sides to sandwich and hold the inorganic polarizer and the transparent substrate,
wherein the second fixing member includes
a fixing member body, and
a holding piece provided in the fixing member body and configured to protrude toward the incident light, and
wherein the first fixing member includes a hole in which the holding piece is inserted.

2. The projector according to claim 1, further comprising a third fixing member configured to hold the first fixing member and the holding member to each other.

3. The projector according to claim 1, wherein a thermal conductivity of the transparent substrate is higher than a thermal conductivity of the inorganic polarizer.

4. The projector according to claim 1, wherein the inorganic polarizer and the second transparent substrate are held in contact with one another without an adhesive.

5. The projector according to claim 1, wherein the inorganic polarizer has a wire-grid layer,
the inorganic polarizer is so disposed that a surface thereof on which the wire-grid layer is formed faces a side on which the light is incident, and
the transparent substrate is disposed on a light exiting side of the inorganic polarizer.

6. The projector according to claim 5, wherein
the inorganic polarizer has an antireflection film formed on a surface facing away from the surface on which the wire-grid layer is formed.

7. The projector according to claim 1, wherein
the transparent substrate has an antireflection film formed at least on a surface on which the light having exited out of the inorganic polarizer is incident.

8. The projector according to claim 1, wherein the holding member includes
a first holding member having a first opening that allows the light having exited out of the transparent substrate or the inorganic polarizer or the light to be incident on the transparent substrate or the inorganic polarizer to pass and a first engaging portion for engagement purposes, the first holding member holding the transparent substrate and the inorganic polarizer on one surface of the first holding member with the transparent substrate and the inorganic polarizer stacked on each other, and
a second holding member having a second opening that allows the light to be incident on the transparent substrate or the inorganic polarizer or the light having exited out of the transparent substrate or the inorganic polarizer to pass, a pressing section that presses the inorganic polarizer or the transparent substrate held in the first holding member, and a second engaging portion that engages with the first engaging portion, the second holding member in cooperation with the first holding member pressing the inorganic polarizer and the transparent substrate from opposite sides to sandwich the inorganic polarizer and the transparent substrate.

9. The projector according to claim 1, wherein
the holding member includes an opening that allows light to be incident on the inorganic polarizer,
the holding member includes a pressing section disposed outside the opening so as to press the inorganic polarizer against the transparent substrate,
the pressing section comprises one or more springs disposed at one or more corners of the opening, and
the one or more springs contact the inorganic polarizer at one or more corners of the inorganic polarizer.

10. The projector according to claim 1,
wherein the holding member includes a first holding member having a first opening that allows light having exited out of the transparent substrate or the inorganic polarizer, or light to be incident on the transparent substrate or the inorganic polarizer, to pass, a second holding member having a second opening that allows light to be incident on the transparent substrate or the inorganic polarizer, or light having exited out of the transparent substrate or the inorganic polarizer, to pass, and a pressing section disposed outside the first opening or the second opening so as to press the inorganic polarizer against the transparent substrate, and wherein the first holding member and the second holding member cooperate to press the inorganic polarizer and the transparent substrate from opposite sides to sandwich the inorganic polarizer and the transparent substrate with the transparent substrate and the inorganic polarizer stacked on each other, and the pressing section comprises one or more springs disposed at one or more corners of the first opening or the second opening.

11. The projector according to claim 10, wherein the first holding member further includes a first engaging portion, the second holding member further includes a second engaging portion, the first engaging portion is configured to protrude in a direction perpendicular to the light having exited out of the transparent substrate or the inorganic polarizer, or the light to be incident on the transparent substrate or the inorganic polarizer, the second engaging portion is configured to bend in a direction parallel to the light having exited out of the transparent substrate or the inorganic polarizer, or the light to be incident on the transparent substrate or the inorganic polarizer, and the first engaging portion and the second engaging portion engage each other.

12. The projector according to claim 11, wherein the second engaging portion includes a guiding hole, and the first engaging portion is inserted into the guiding hole.

* * * * *